United States Patent
Hoshyar et al.

(10) Patent No.: US 8,964,916 B2
(45) Date of Patent: Feb. 24, 2015

(54) SIGNAL-TO-NOISE RATIO (SNR) DEPENDENT CHANNEL TRACKING FOR SMART UTILITY NETWORKS (SUN) ORTHOGONAL FREQUENCY DIVISION MULTIPLEXING (OFDM)

(71) Applicant: Texas Instruments Incorporated, Dallas, TX (US)

(72) Inventors: Reza Hoshyar, San Jose, CA (US); Anuj Batra, Dallas, TX (US); Timothy Mark Schmidl, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 14/145,431

(22) Filed: Dec. 31, 2013

(65) Prior Publication Data

US 2014/0307841 A1    Oct. 16, 2014

Related U.S. Application Data

(60) Provisional application No. 61/810,532, filed on Apr. 10, 2013.

(51) Int. Cl.
*H04B 1/10* (2006.01)
*H04L 27/26* (2006.01)
*H04B 17/00* (2006.01)

(52) U.S. Cl.
CPC .......... *H04L 27/2647* (2013.01); *H04B 17/006* (2013.01)
USPC .......................................... 375/350

(58) Field of Classification Search
CPC ........................... H04L 27/2647; H04B 17/006
USPC ......................................... 375/350
See application file for complete search history.

(56) References Cited

U.S. PATENT DOCUMENTS

| | | | |
|---|---|---|---|
| 2009/0080575 A1* | 3/2009 | Chuang et al. | 375/340 |
| 2010/0118917 A1* | 5/2010 | Oh et al. | 375/130 |
| 2014/0050254 A1* | 2/2014 | Azizi et al. | 375/219 |

* cited by examiner

*Primary Examiner* — Juan A Torres
(74) *Attorney, Agent, or Firm* — John R. Pessetto; Frederick J. Telecky, Jr.

(57) ABSTRACT

An orthogonal frequency-division multiplexed (OFDM)-based receiver for channel tracking with signal-to-noise ratio dependent parameters that includes a memory; and a signal processor, coupled to the memory. The signal processor to estimate a signal-to-noise ratio (SNR) for a received packet of OFDM symbols and determine an SNR region in which the SNR estimate falls, wherein the signal processor implements a different set of finite impulse response (FIR) filter coefficients for each SNR region.

20 Claims, 1 Drawing Sheet

SIGNAL-TO-NOISE RATIO (SNR) DEPENDENT CHANNEL TRACKING FOR SMART UTILITY NETWORKS (SUN) ORTHOGONAL FREQUENCY DIVISION MULTIPLEXING (OFDM)

CROSS-REFERENCE TO RELATED APPLICATION

The present application claims priority to U.S. Provisional Patent Application No. 61/810,532, filed on Apr. 10, 2013; which is hereby incorporated herein by reference.

BACKGROUND

Smart Utility Networks (SUN) employing the IEEE 802.15.4g standard may use orthogonal frequency division multiplexing (OFDM) as a modulation technique. The OFDM modulation may result in the transmission of a packet of OFDM symbols. Each OFDM symbol comprised of a plurality of sub-carriers, also referred to as tones. The SUN systems may wirelessly transmit data from smart meters at an end point, e.g., a house or business, to a utility collection point. Alternatively, the transmissions may use the existing power line cables and propagate through the transformers on their way to the collection point. The collection point, a local router servicing many end points, transmits the collected data to the utility company for further processing. The collection point may transmit the data using any wired or wireless means. During the transmission of the OFDM symbols from the end points to the collection point, however, the channel condition may be affected by the introduction of time variations in the sub-carriers. The SUN system may need to adjust for these time variations to reliably track the channel conditions and decode the OFDM symbols with the use of finite impulse response filters.

SUMMARY

The problems noted above are solved in large part by an orthogonal frequency-division multiplexed (OFDM)-based receiver for channel tracking with signal-to-noise ratio dependent parameters that includes a memory; and a signal processor, coupled to the memory. The signal processor to estimate a signal-to-noise ratio (SNR) for a received packet of OFDM symbols and determine an SNR region in which the SNR estimate falls, wherein the signal processor implements a different set of finite impulse response (FIR) filter coefficients for each SNR region.

Another solution may be a smart utility network device that includes a receiver configured to receive orthogonal frequency-division multiplexed (OFDM) symbols; and a signal processor coupled to the receiver. The signal processor configured to estimate a signal-to-noise ratio (SNR) of a packet of OFDM signals based on the long training frame (LTF) symbols included in the OFDM packet, determine a SNR region in which the SNR estimate falls, wherein there are at least two SNR regions and each SNR region is associated with a set of finite impulse response (FIR) filter coefficients and a forgetting factor, and based on the SNR region, generate estimates of a complex or real channel gain for each tone of each OFDM symbol in the OFDM packet with the SNR region's associated FIR filter coefficients and the forgetting factor.

And yet another solution may be a method for signal-to-noise ratio (SNR) dependent complex channel gain tracking of an orthogonal frequency-domain multiplexing (OFDM)-based receiver that includes receiving, by a receiver, a packet of OFDM symbols, wherein a preamble of the packet includes long training field (LTF) symbols, estimating, by the receiver, a SNR value with the LTF symbols, determining, by the receiver, a SNR region in which the SNR estimate falls, and generating, by the receiver, estimates of a complex channel gain for tones of the OFDM symbols based on a set of finite impulse response (FIR) filter coefficients associated with the SNR region and smoothing the tones of the OFDM symbols along a time-domain using a forgetting factor associated with the SNR region.

BRIEF DESCRIPTION OF THE DRAWINGS

For a detailed description of exemplary embodiments of the invention, reference will now be made to the accompanying drawings in which.

NOTATION AND NOMENCLATURE

Figure 1:
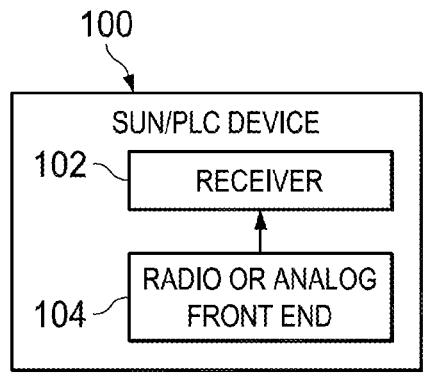
FIG. 1 shows a block diagram of a SUN device 100 for SNR dependent channel tracking.

Certain terms are used throughout the following description and claims to refer to particular system components. As one skilled in the art will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct electrical connection. Thus, if a first device couples to a second device, that connection may be through a direct electrical connection, or through an indirect electrical connection via other devices and connections.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

A SUN system is a low rate (40 kbps to 1 Mbps), low power wireless technology that is specifically designed to be used in utility metering applications, such as transmitting electric, gas, or water usage data from the meter(s) on the customer premises to a data collection point operated for the utility. For example, meters could be installed for each house in a residential neighborhood, and then the data could be sent every 15 minutes from each meter to a pole-top data collection point. This data collection point could then be connected by fiber, copper wire, or wireless to a central office which collects all the data for a region. Data could either be sent directly from each meter to the collection point, or it could be hopped from meter to meter until it reaches the collection point.

As noted above, the SUN systems are moving to implement OFDM modulation in the transmission of utility usage data from a customer's smart meter to the data collection point. OFDM-based transmissions use OFDM symbols to transmit the usage data. The OFDM symbols conventionally comprise a plurality of sub-carriers or tones with the tones carrying the bits of data. The transmission of the OFDM packets from one point to another may occur in what is referred to as the channel. A channel condition may refer to the physical propagation environment conditions that may cause variations in the tones of the OFDM symbols. The variations may affect both the tone values in the frequency-domain and the time-domain, which may manifest as a complex channel gain multiplier value included in each tone of the OFDM symbols received. In addition, noise introduced into the signal may affect the calculation of the complex channel gain. The resulting signal-to-noise ratio (SNR) may impact the demodulation and decoding of the OFDM symbols.

The data transmitted over different sub-carriers may experience different channel gains. This is due to multi-path propagation of the transmitted signal caused by reflections off of various objects and other time delays introduced into the signal. Besides this frequency domain variation, the channel condition may change over time due to dynamics of the propagation environment. For a receiver to reliably decode the transmitted data, the OFDM modulation technique requires a reliable estimation of the complex channel gain associated with all the subcarriers of each of the OFDM symbols as well as reliable tracking of their change over time.

The OFDM symbols containing the usage data, also known as the payload or data-carrying OFDM symbols, may be combined into an OFDM packet, where the packet may include various other OFDM symbols. The various other OFDM symbols may be used to assist with channel tracking and extra sections to assist with symbol differentiation. For example, the start of the frame may include 4 short training field OFDM symbols followed by 2 long training fields (LTF) OFDM symbols. The 2 LTF symbols may be averaged to generate 1 LTF symbol. The LTF symbol may provide initial complex channel gain estimations for each sub-carrier, also referred to as tones, of the LTF symbol. Additionally, the LTF symbols may be used by the receiver to estimate complex channel gain for the tones of the remaining OFDM symbols in the packet in conjunction with a periodic sequence of pilot tones embedded in the data-carrying OFDM symbols. The values of the tones of the LTF symbols and the pilot tones imbedded in the payload symbols may be of known values to the receiver. Since the receiver knows what these values should be, the difference between the known value and the received value allows the receiver to estimate the complex channel gain for those tones. The receiver may then use the complex channel gain estimates from the pilot tones and the LTF tones to estimate the complex channel gains for the remaining tones of the OFDM symbol. This further estimation may lead to reliable demodulation of the data.

The estimation of the complex channel gain for the tones of an OFDM symbol may be performed by a finite impulse response (FIR) filter. The FIR filter may generate estimates of the complex channel gain of the odd tones of an OFDM symbol using a first set of coefficients and then generate estimates of the complex channel gain of the even tones of the OFDM symbol using a second set of OFDM coefficients. The coefficients used by the FIR filter, however, may be SNR dependent, and the channel tracking, i.e., tracking the changes in the complex channel gain over frequency and time, may also be SNR dependent. To account for the SNR dependencies, different coefficients for the FIR filter may be used depending on the estimated SNR value of a received OFDM packet.

The estimation of the complex channel gain for the tones of each OFDM symbol may allow for a receiver to track the channel conditions from OFDM symbol to OFDM symbol, i.e., symbol-wise tracking. The symbol-wise channel tracking may be implemented using various filtering techniques to obtain estimates of the complex channel gain for each tone of the OFDM symbols received by the smart meters. The symbol-wise channel tracking includes smoothing an OFDM symbol along the tones, i.e., along the frequency-domain. In addition to the smoothing along the tones, the OFDM symbols will also undergo an operation to smooth them along the time-domain in order to suppress the estimation error and exploit the time domain channel correlation. The time-domain smoothing may require buffering the channel estimates of several OFDM symbols by applying an FIR or IIR (infinite impulse response) filter. To reduce buffering requirements as well as avoiding latency in data decoding due to this buffering, a first order IIR filtering is implemented that may only require storing the channel estimates of a previous OFDM symbol instead of a number of OFDM symbols that cover the complete period of pilot tones.

FIG. 1 shows a block diagram of a SUN device 100 for SNR dependent channel tracking as discussed herein. The device 100 may comprise a receiver 102 coupled to a radio or analog front end 104. The radio or analog front end 104 may initially receive the wirelessly transmitted OFDM symbols before relaying the OFDM symbols to the receiver 102 for processing, such as complex channel gain estimation, OFDM demodulation and data decoding. The device 100 may be a smart meter at an end user's location or it may be the data collection point. In either case, the device 100 may receive OFDM packets from other similar devices for routing to the data collection point.

For the receiver 102 to demodulate the OFDM symbols and decode the data, reliable estimations of the complex channel gain for each tone of the OFDM symbols may be necessary. The estimations of the complex channel gain may be generated by an FIR filter that uses different sets of coefficients to generate estimates of the channel gain for odd tones and the even tones. Pilot tones included in the OFDM symbols may be used to assist with the complex channel gain estimations. The complex channel gain may be affected by time varying changes of the channel condition (the physical attributes of the path the wireless signal takes from transmitter to receiver that affects the signal). Additionally, as noted, various levels of noise may also be introduced into the signal due to the channel condition. This noise may also need to be accounted for to reliably decode the data.

Disclosed herein are devices and methods to account for an estimated SNR of a received OFDM packet in order to reliably track the complex channel gain in frequency and time in order to demodulate the OFDM symbols and decode the data. The estimated SNR value may be used to calculate and select the FIR filter coefficients and a forgetting factor in order to smooth the complex gain estimates in both frequency and time domains. A number of SNR ranges may be defined and nominal SNR values associated with those ranges may be used to calculate associated FIR filter coefficients and an associated forgetting factor. Thus, when a receiver receives an OFDM packet, the receiver may first estimate an SNR value. Then, based on the value, determine an SNR region in which the value falls. That SNR region may have a set of associated FIR filter coefficients and a forgetting factor that the receiver may then use to estimate the complex channel gain in the frequency-domain and then smooth the channel estimates along the time-domain.

Figure 2:
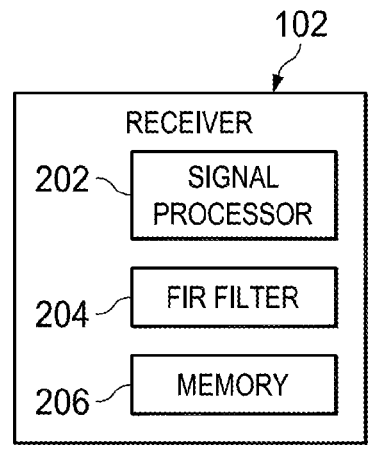
FIG. 2 is a block diagram of a receiver 102 for SNR dependent channel tracking.

FIG. 2 is a block diagram of a receiver 102 for SNR dependent channel tracking as discussed herein. The receiver 102 may include a signal processor 202, an FIR filter 204, and a memory 206. The receiver 102 may process OFDM packets and symbols to estimate the complex channel gain along the frequency-domain and also smooth the complex channel gain along the time-domain for the tones of the OFDM symbols. The estimates of the complex channel gain for the tones of the OFDM symbols may be generated by the FIR filter 204 using two sets of coefficients—one set for the odd tones and one set for the even tones. The sets of coefficients used by the FIR filter 204 may be chosen by the signal processor 202 based on an SNR value estimate for the OFDM packet calculated by the signal processor 202. The signal processor 202 may then smooth the tones of the OFDM symbol along a time domain using a forgetting factor that may also be dependent upon the estimated SNR value. The principles disclosed herein may be implemented in a signal processor, an application specific integrated circuit (ASIC), or other type of device.

The signal processor 102 may determine an SNR region in which the SNR value falls. Any number of SNR regions falls within the scope of this disclosure. For sake of brevity, three SNR regions will be used as an example. For each SNR region, there may be an associated set of FIR filter coefficients and an associated forgetting factor. The associated FIR filter coefficients may be used to generate the complex gain estimates of the even and odd tones of the OFDM symbols. Additionally, the set of FIR filter coefficients may be divided into two sets—one set for generating the complex channel gains for the odd tones and one set for generating the complex channel gain for the even tones. The FIR filter coefficients may be used to smooth the channel gain estimates for the OFDM symbols in the frequency-domain. The associated forgetting factor may be used to smooth the channel gain estimates for the OFDM symbols in the time-domain.

The SNR dependency of the FIR filter coefficients may be accounted for through the application of the minimum mean square error (MMSE) principal. In addition to the SNR dependency, there may also be a dependency on a timing error that may also be considered in the calculation of the FIR filter's coefficients. Besides the dependency of the FIR coefficients to SNR, the time-domain smoothing of the tracking algorithm can also be made SNR-dependent to efficiently trade off noise suppression on one hand and the tracking capability on the other hand.

The FIR filter coefficients may be calculated using the following equation:

$$m_{s,\tau} = F_{s,\tau} F_{p_s,\tau}^H \left( F_{p_s,\tau} F_{p_s,\tau}^H + \frac{L_{ch}}{SNR} I \right)^{-1}$$

In the above expression $F_{p,\tau}$ is a sub-matrix of the DFT matrix F, where p is choosing its rows and $\tau$ is choosing the columns, respectively, and $L_{ch}$ is the channel length. $\tau$ is the delay vector and in ideal timing conditions consists of possible delays that might happen when the signal transmitted through the channel. The delays are in terms of the receiver digital samples. The above equation may be used to calculate all of the FIR filter coefficients.

The FIR coefficients derived through MMSE principle may depend on the received signal SNR explicitly through the SNR value used in calculation of the coefficients and implicitly through the delay vector or timing error effect. Also the forgetting factor $\lambda$ used for smoothing along the time domain may be adjusted based on SNR value to improve the tracking performance. The estimated SNR value may be associated with three SNR regions, such as a low SNR region, a medium SNR region, and a high SNR region. An SNR estimator based on either a short training field (STF) or LTF symbols may show what SNR region the receiver is operating in. Such an approach may enable the signal processor 102 to account for and adjust the aforementioned SNR dependencies. The three SNR regions in dB may be $SNR_{LOW}$: $(-\infty,10)$, $SNR_{MED}$: $[10,20)$, and $SNR_{HIGH}$: $[20, \infty)$ for achieving good packet error rate (PER) performances for different MCS (modulation and coding set) selections.

In the expression above, the SNR variable is shown inside of the parenthetical. Changing this value may allow calculation of the FIR filter coefficients for various SNR regions. As such, a nominal SNR values that fall within the three SNR regions was used when calculating their associated coefficients. For example, For $SNR_{LOW}$ a nominal SNR value of 5 dB may be used. For $SNR_{MED}$ and $SNR_{HIGH}$ the nominal values of 15 dB and 25 dB, respectively, may be used.

The timing error effect may be included in the above expression by replacing the delay vector $\tau=(0, 1, \ldots, L_{ch}-1)$ with an updated value of $$\tau = \left( \frac{CP-\Delta}{2}, \frac{CP-\Delta}{2}+1, \ldots, \frac{CP+\Delta}{2}+L_{ch}-1 \right).$$

In the previous expressions, $L_{ch}-1$ is the channel maximum delay and CP is the cyclic prefix length. The timing error may cause the overall observed channel to exhibit a longer delay span. The timing error may be higher at lower SNRs and may reduce as SNR increases. Thus, choosing a different $\Delta$ for each of the three SNR regions, the timing errors for the three SNR regions may be $\Delta_{LOW}=4$, $\Delta_{MED}=2$ and $\Delta_{HIGH}=1$. Hence, by substituting these $\Delta$ values into the expression above along with the SNR value for the corresponding SNR region, the SNR-dependent FIR filter coefficients may be calculated for each SNR region.

The FIR coefficients for each of the three SNR regions may be pre-calculated and stored in the memory 206. Alternatively, the FIR coefficients for each of the SNR regions may be calculated by the signal processor 102 "on the fly" by determining the SNR region and using the corresponding nominal SNR value and forgetting factor. In the example where the coefficients are pre-calculated and stored in the memory 206, the signal processor 202, upon the receiver 102 receiving an OFDM packet, may first estimate the SNR value using an LTF symbol. Based on the estimated SNR value, the signal processor 102 may determine what SNR region the SNR value falls, which may determine the FIR filter coefficients to retrieve from the memory 206 to be used by the FIR filter 204.

The forgetting factor may be used by the signal processor 202 to smooth the channel estimates of the OFDM symbols along the time-domain. The forgetting factor may be used to trade-off between tracking capability and noise suppression. For high level of time variability, this parameter may need to be increased to enhance the tracking performance. On the other hand, under noisy conditions (low SNR) a smaller value may be preferred. Optimal adjustment of this parameter may require an accurate knowledge of channel conditions as well as the received SNR. One approach may be to consider the same three SNR regions and find the best value of $\lambda$ for these regions under nominal channel conditions. For the considered SNR regions of $SNR_{LOW}$: $(-\infty,10)$, $SNR_{MED}$: $[10,20)$, and $SNR_{HIGH}$: [20, ∞) the three values of λ, for example, may be $\lambda_{LOW}=0.15$, $\lambda_{MED}=0.25$, and $\lambda_{HIGH}=0.45$.

After the OFDM symbols are filtered by the FIR filter to smooth the channel estimates of the tones of an OFDM symbol, the signal processor 202 may then use the forgetting factor to smooth the channel estimates of the tones along the time-domain. After the time-domain smoothing, the result may be a final channel estimate to be used for decoding the data of the OFDM symbol.

Figure 3:
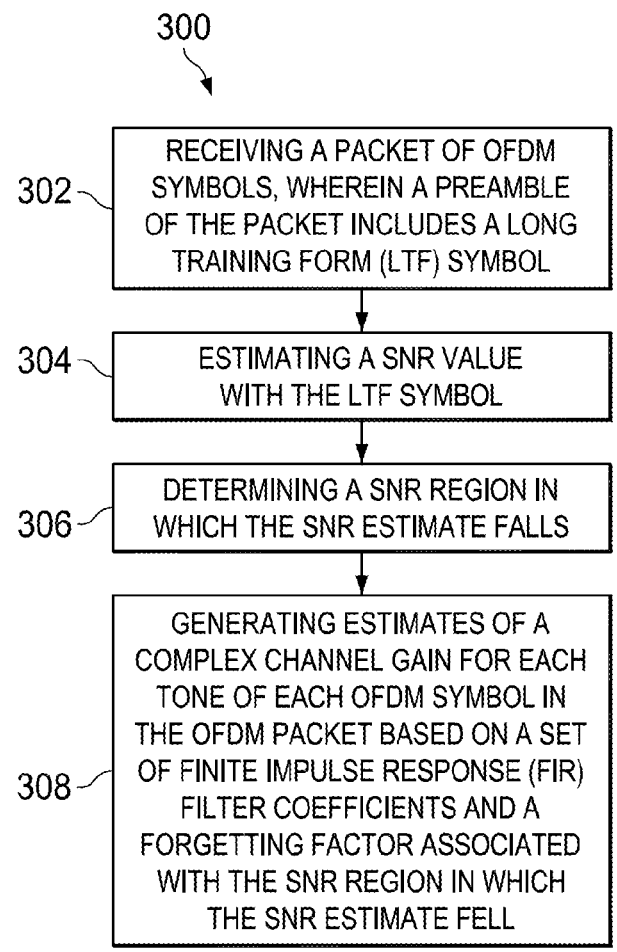
FIG. 3 is a flow chart of an example method 300 for implementing the SNR dependent channel tracking.

FIG. 3 is a flow chart of an example method 300 for implementing the SNR dependent channel tracking as discussed herein. The method 300 may begin at step 302 with receiving a packet of OFDM symbols. The OFDM packet may include an LTF symbol that may be used in step 304 to estimate the SNR value. The signal processor 202 may estimate the SNR value from the LTF symbols by estimating the power in the LTF symbol to determine the signal plus noise power. The noise power may be estimated by subtracting one LTF repetition from the other LTF repetition (the LTF symbol includes two repetitions of itself) so that the remainder has double the noise plus interference power. The ratio of these two estimates may correspond to the estimates of the SNR value from the LTF, and preferably to the value of 1+SNR.

The method 300 then continues at step 306 with determining what SNR region in which the SNR value falls. The method 300 then continues at step 306 where the SNR region determination may then determine the FIR filter coefficients to use to generate the complex (or real) channel gain estimates for the tones of the OFDM symbols. The SNR region may also determine the forgetting factor to use when smoothing the complex (or real) channel gains of the OFDM symbols in the time-domain.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. An orthogonal frequency-division multiplexed (OFDM)-based receiver for channel tracking with signal-to-noise ratio dependent parameters, comprising:
a memory; and
a signal processor, coupled to the memory, to estimate a signal-to-noise ratio (SNR) for a received packet of OFDM symbols and determine an SNR region in which the SNR estimate falls, wherein the signal processor implements a different set of finite impulse response (FIR) filter coefficients for each SNR region.

2. The receiver of claim 1, wherein the signal processor derives the FIR filter coefficients for each SNR region based on a nominal SNR value for each SNR region and an SNR-dependent timing error.

3. The receiver of claim 1, wherein the signal processor implements a different forgetting factor for each SNR region, wherein the forgetting factor is implemented by the signal processor to smooth channel estimates along time-domain for the OFDM symbols.

4. The receiver of claim 1, wherein the signal processor generates an estimate for a complex gain for each tone of each OFDM symbol in the OFDM packet using a FIR filter with the corresponding set of FIR filter coefficients for an SNR region.

5. The receiver of claim 3, wherein the different sets of FIR filter coefficients and the forgetting factor for each SNR region are stored in the memory.

6. The receiver of claim 4, wherein the signal processor generates the estimate for the gain for odd subcarriers of each OFDM symbol using a first set of FIR filter coefficients.

7. The receiver of claim 4, wherein the signal processor generates the estimate for the gain for even subcarriers of each OFDM symbol using a second set of FIR filter coefficients.

8. The receiver of claim 4, wherein the signal processor uses a forgetting factor to generate a refined estimate of the gain for each OFDM symbol of the OFDM packet.

9. A smart utility network device, comprising:
a receiver configured to receive orthogonal frequency-division multiplexed (OFDM) symbols; and
a signal processor coupled to the receiver, the signal processor configured to;
estimate a signal-to-noise ratio (SNR) of a packet of OFDM signals based on a long training field (LTF) symbol included in the OFDM packet;
determine a SNR region in which the SNR estimate falls, wherein there are at least two SNR regions and each SNR region is associated with a set of finite impulse response (FIR) filter coefficients and a forgetting factor; and
based on the SNR region, generate estimates of a channel gain for each tone of each OFDM symbol in the OFDM packet with the SNR region's associated FIR filter coefficients and the forgetting factor.

10. The device of claim 9, further comprising a memory coupled to the signal processor to store the FIR filter coefficients and the forgetting factor associated with each SNR region.

11. The transceiver of claim 9, wherein the FIR filter coefficients for each SNR region are pre-determined based on a nominal SNR value associated with each SNR region.

12. The device of claim 9, wherein the FIR filter coefficients associated with each SNR region comprise a first set of coefficients and a second set of coefficients.

13. The device of claim 9, wherein the forgetting factor is used to improve the channel gain along a time domain of the OFDM symbols.

14. The device of claim 9, wherein there are three SNR regions.

15. The device of claim 11, wherein the FIR filter coefficients for each SNR region are further based on an SNR-based timing error.

16. The device of claim 12, wherein the first set of coefficients is used by the FIR filter to generate an improved estimate of a channel gain for odd subcarriers of the OFDM symbols.

17. The device of claim 12, wherein the second set of coefficients is used by the FIR filter to generate an improved estimate channel gain for even subcarriers of the OFDM symbols.

18. A method for signal-to-noise ratio (SNR) dependent channel gain tracking of an orthogonal frequency-domain multiplexing (OFDM)-based receiver, comprising:
receiving, by a receiver, a packet of OFDM symbols, wherein a preamble of the packet includes a long training field (LTF) symbol;
estimating, by the receiver, a SNR value with the LTF symbol;
determining, by the receiver, a SNR region in which the SNR estimate falls; and
generating, by the receiver, estimates of a channel gain for tones of the OFDM symbols based on a set of finite impulse response (FIR) filter coefficients associated with the SNR region and smoothing the tones of the OFDM symbols along a time-domain using a forgetting factor associated with the SNR region.

19. The method of claim 18, further comprising:
retrieving, by the receiver, the set of finite impulse response (FIR) filter coefficients and the forgetting factor associated with the SNR region in which the SNR estimate fell.

20. The method of claim 18, wherein there are at least two SNR regions.

* * * * *